United States Patent [19]

Kitamori

[11] 3,959,189

[45] May 25, 1976

[54] PROCESS FOR PRODUCING POLYETHYLENE RESIN PARTICLES AND FOAMABLE POLYETHYLENE RESIN PARTICLES

[75] Inventor: Yoshiaki Kitamori, Nara, Japan

[73] Assignee: Sekisui Kaseihin Kabushiki Kaisha, Nara, Japan

[22] Filed: Dec. 20, 1973

[21] Appl. No.: 426,752

[52] U.S. Cl............................ 260/2.5 B; 260/2.5 E; 260/878 R; 260/881; 260/884; 260/885
[51] Int. Cl.$^2$........................................... C08J 9/00
[58] Field of Search ...................... 260/2.5 B, 878 R

[56] References Cited
UNITED STATES PATENTS

| | | | |
|---|---|---|---|
| 3,413,244 | 11/1968 | Laudler et al................. | 260/2.5 HA |
| 3,542,702 | 11/1970 | Okoda et al. ................ | 260/2.5 HA |
| 3,714,083 | 1/1973 | Nakayama et al. ........... | 260/2.5 HA |
| 3,743,611 | 7/1973 | Muroi et al. ..................... | 260/2.5 B |

*Primary Examiner*—Richard B. Turer
*Attorney, Agent, or Firm*—Sughrue, Rothwell, Mion, Zinn & Macpeak

[57] ABSTRACT

A process for producing polyethylene resin particles which comprises suspending in an aqueous medium polyethylene resin particles having an MI value of 0.3 to 10, a density of less than 0.93 g/cm$^3$ and a softening point below 85°C, adding to the suspension 30 to 100% by weight based on the weight of the particles of a styrene monomer and a catalyst for polymerizing the monomer, and polymerizing the monomer. Embodiments additionally include adding a cross-linking agent for the polyethylene prior to the polymerization to the suspension and crosslinking and polymerizing the polyethylene and the styrene, respectively, and impregnating a blowing agent in the polyethylene resin particles containing the polymerized styrene resin or in the cross-linked polyethylene resin particles containing the polymerized styrene resin to form foamable polyethylene resin particles.

15 Claims, No Drawings

PROCESS FOR PRODUCING POLYETHYLENE RESIN PARTICLES AND FOAMABLE POLYETHYLENE RESIN PARTICLES

BACKGROUND OF THE INVENTION

1. Field of the Invention

The present invention relates to a processes for producing polyethylene resin particles. In greater detail, the present invention relates to a process for producing polyethylene resin particles suitable for producing foamable polyethylene resin particles having good molding properties which can be prefoamed to a low bulk density and can form moldings having good rigidity, from which suitable articles can be produced by adding a blowing agent to the polyethylene resin particles to form foamable polyethylene resin particles, heating the particles to produce prefoamed particles, charging the pre-foamed particles in a mold cavity which permits the escape of gases but retains the foamable polyethylene resin articles, and heating them; and to a process for producing foamable polyethylene resin particles containing a polystyrene resin uniformly dispersed therein which comprises adding a blowing agent to the resulting resin particles.

2. Description of the Prior Art

In order to produce foamable polyethylene resin particles which can be pre-foamed to a low bulk density, it is necessary to impregnate a blowing agent consisting of volatile aliphatic hydrocarbons such as n-butane, iso-butane, n-pentene, iso-pentane and dichlorodifluoromethane into the polyethylene resin particles. However, although the particles containing the blowing agent can be foamed to a low bulk density just after production thereof, it is necessary to leave the particles for a definite period because the cells produced just after production are very unstable, i.e., because the polyethylene resin has a high gas permeability. Consequently, there is a disadvantage in that particles having high bulk density are actually produced if the particles are allowed to i.e., because the blowing agent disappears on standing. At the same time methods for producing foamable polystyrene resin particles, for example, a method which comprises suspending polystyrene resin particles in an aqueous medium and adding a small amount of a solvent which dissolves the resin particles and adding a blowing agent to the resulting suspension to impregnate the blowing agent in the resin particles, and a method which comprises blending polystyrene resin particles and a blowing agent in an extruder, molding by extruding as thin strands, quenching immediately and pelletizing the strands, cannot be applied to production of the foamable polyethylene resin particles. Even if such methods could be so adopted, the molding conditions are very severe (the viscoelasticity of the polyethylene at foaming is less than that of the polystyrene resin), and consequently it would be difficult to produce preferred articles and moldings.

A process for cross-linking the polyethylene resin has been suggested as a means for preventing the disappearance of the blowing agent (volatile aliphatic hydrocarbons) included in the foamable polyethylene resin particles and as a means for adjusting the viscoelasticity at foaming. Namely, a method is known which comprises impregnating the blowing agent using various techniques and then cross-linking the polyethylene resin by applying radiant rays before the blowing agent disappears and therefore is lost, and a method is described in Japanese Pat. No. 32622/70 which comprises carrying out impregnation of the blowing agent simultaneously with the cross-linking in the suspension. According to the former method, the cost of the equipment is high, although cross-linking can be carried out in a short period of time. Therefore, this method is not economically preferred because the foamable polyethylene resin particles produced are expensive. In the latter method, since the cross-linking and the impregnation are carried out at the same time, the impregnation of the blowing agent is, of course, carried out at the cross-linking temperature. Accordingly, where n-propane, dichlorodifluoromethane and chlorodifluoromethane, which are always gaseous, are used as the blowing agent, the pressure abnormally increases. Thus, if the cross-linking and the impregnation are carried out under such conditions, the polyethylene resin particles are flattened by such high pressures and good foamable polyethylene resin particles cannot be obtained. Further, in order to carry out the method at such high pressures, it is necessary to use a high-pressure high-temperature reactor.

Further, the method descried in Japanese Pat. No. 32623/70 has been suggested. According to this method, since the polystyrene resin is uniformly included in the polyethylene resin particles, disappearance of the blowing agent can be prevented and articles having somewhat improved rigidity can be obtained. However, since cross-linking of the polyethylene resin, polymerization of styrene and impregnation of the blowing agent are carried out at the same time, the blowing agent causes a decrease in the viscosity of the mixture and consequently a long period of time is required for polymerization. In order to prevent these defects, the quantity of the styrene monomer used is limited to below 20% by weight based on the polyethylene resin particles. Furthermore, since the polymerization of the styrene monomer is carried out at a temperature below the cross-linking temperature, the polyethylene resin particles containing polystyrene resin having a low degree of polymerization. Consequently, when pre-foamed particles are produced therefrom by heating, cells in the pre-foamed particles become nonuniform or pre-foamed particles having an excellent molding property cannot be obtained because the second foaming ability thereof is decreased. Still more, this method has the disadvantage that articles having excellent rigidity can not be obtained. Moreover, in a case of using a gaseous blowing agent such as n-propane, n-butane or dichlorotetrafluoroethane, it is necessary to use a high-pressure autoclave because the reaction system is under a high pressure.

SUMMARY OF THE INVENTION

As the result of research conducted to overcome the above-described numerous disadvantages of the prior art on, on a process for producing foamable polyethylene resin particles having an excellent molding property, high foaming ability (which is the same as or nearly equal to that of the prior foamable polystyrene particles) and good rigidity, wherein the disappearance of the blowing agent is prevented and the properties of the polyethylene resin itself are not deteriorated, has been achieved. The present inventor has found that all of the disadvantages of the prior polyethylene resins can be removed by adding a polystyrene resin to the polyethylene resin particles in an amount of 30 to 100% by the weight based on the polyethylene resin particles and that all the disadvantages of the prior foamable polyethylene resin particles can be eliminated by adding a blowing agent to these polyethylene resin particles. Namely, the present invention provides a process to accomplish the above-described advantages over the prior art and includes the following embodiments:

1. a process for producing polyethylene resin particles which comprises suspending polyethylene resin particles having an MI (melt index) value of 0.3 to 10, a density less than 0.93 g/cm$^3$ and a softening point below 85°C in an aqueous medium, adding to this suspension 30 to 100% by weight based on the weight of the polyethylene resin particles of a styrene monomer and a catalyst for polymerizing the styrene monomer, and polymerizing the styrene monomer;

2. a process for producing polyethylene resin particles which comprises suspending polyethylene resin particles having an MI value of 0.3 to 10, a density of less than 0.93 g/cm$^3$ and a softening point below 85°C in an aqueous medium, adding to this suspension a cross-linking agent for cross-linking the polyethylene resin particles, 30 to 100% by the weight based on the weight of the polyethylene resin particles of a styrene monomer and a catalyst for polymerizing the styrene monomer, and cross-linking the polyethylene resin particles and polymerizing the styrene monomer;

3. a process for producing foamable polyethylene resin particles which comprises suspending polyethylene resin particles having an MI value of 0.3 to 10, a density of less than 0.93 g/cm$^3$ and a softening point below 85° C in an aqueous medium, adding to this suspension 30 to 100% by weight based on the weight of the polyethylene resin particles of a styrene monomer and a catalyst for polymerizing the styrene monomer, polymerizing the styrene monomer, and incorporating a blowing agent in the resulting polyethylene resin particles which contain a polystyrene resin foamed by the polymerization of the styrene monomer, wherein the blowing agent does not dissolve the polyethylene resin particles or only slightly swells the polyethylene resin particles; and 4. a process for producing foamable polyethylene resin particles which comprises suspending polyethylene resin particles having an MI value of 0.3 to 10, a density of less than 0.93 g/cm$^3$ and a softening point of below 85°C in an aqueous medium, adding to the suspension a cross-linking agent for cross-linking the polyethylene resin particles, 30 to 100% by the weight based on the weight of the polyethylene resin particles of a styrene monomer and a catalyst for polymerizing the styrene monomer, cross-linking the polyethylene resin particles and polymerizing the styrene monomer, and incorporating a blowing agent in the resulting previously cross-linked polyethylene resin particles which contain a polystyrene resin formed by the polymerization of the styrene monomer, wherein the blowing agent does not dissolve the polyethylene resin particles or only slightly swells the polyethylene resin particles.

DETAILED DESCRIPTION OF THE INVENTION

The polyethylene resins used in the embodiments of the process of the present invention include ethylene homopolymers and copolymers containing ethylene as the major component, e.g., more tha 50% by weight, such as an ethylene-vinyl chloride copolymer an ethylene/vinyl acetate copolymer and ethylene-methyl methacrylate copolymer, which are in the form of globular particles or pellets. Particularly in the present invention, polyethylene resins having an MI value of 0.3 to 10, a density less than 0.93 g/cm$^3$ and a softening point below 85°C are used. While the lower limits of the density and the softening points of the polyethylene are not limiting, the generally encountered lower limits from a practical standpoint are a density of about 0.915 g/cm$^3$ and a softening point of about 85°C. Namely, if the polyethylene resin particles have a density greater than 0.93 g/cm$^3$ and a softening point above 85°C, the styrene monomer is not rapidly absorbed into the polyethylene resin particles and polyethylene resin particles uniformly containing the polystyrene resin can not be obtained. On the other hand, if foamable polyethylene resin particles uniformly containing the polystyrene resin are produced from a polyethylene resin having an MI value above 10 by adding the blowing agent, the retention of the blowing agent is low and particles having a desired bulk density cannot be obtained by heating. However, by using polyethylene resin particles having an MI value of 0.3 to 10, retention and foaming ability of the blowing agent are remarkably improved. A suitable particle size which can be effectively used ranges from about 0.5 to 5 mm, preferably 2 to 4 mm. Further, by using polyethylene resin particles having a density less than 0.93 g/cm$^3$ and a softening point below 85°C, the absorption of the styrene monomer can be rapidly carried out and consequently it becomes possible to produce particles wherein the polystyrene resin formed by the polymerization is uniformly dispersed.

In the embodiments of the process of the present invention, styrene monomers are used. The styrene monomers which can be used include styrene and mixtures of styrene, in an amount of more than 50% by weight of styrene, and copolymerizable monomers, for example, mixtures of styrene and α-methylstyrene, acrylonitrile, methyl methacrylate, dimethyl maleate or divinylbenzene, etc.

The amount of the above-described styrene monomers which can be used is 30 to 100% by weight based on the weight of the polyethylene resin particles. For rigid particles a suitable range is from about 60 to 100% by weight and for elastic particles a suitable range is about 30 to 60% by weight.

One of characteristics of the embodiments of the process of the present invention is to use the sytrene monomer in an amount within the above, described range based on the weight of the polyethylene resin particles. Namely, if foamed polyethylene resin articles are produced from only a polyethylene resin, they are not suitable for using as packaging materials for heavy articles because they are too elastic, although they do have excellent characteristics in that they do not produce a black smoke when burned and they do have good oil resistance and solvent resistance. On the other hand, if foamed polystyrene resin articles are produced from only a polystyrene resin, the polystyrene resin moldings generate black smoke when burned and have inferior oil resistance and solvent resistance, although polystyrene resin moldings have good rigidity. On the contrary, if polyethylene resins containing a styrene resin which are produced by the embodiments of the process of the present invention are used for molding, the foamed polyethylene resin articles produced have both the characteristics of the polystyrene resin and the polyethylene resin. If the amount of the styrene monomer is below 30% by weight, the resulting articles have poor rigidity and it is impossible to produce moldings having a low bulk density because the blowing agent cannot be sufficiently retained in the particles. On the other hand, if the amount is above 100% by weight, the characteristics of the polyethylene resin itself are lost. Further, the resulting articles generate black smoke when burned and have inferior solvent resistance and oil resistance.

The styrene monomer is easily and rapidly absorbed in the polyethylene resin particles when it is added to the polyethylene resin particles with the absorption generally taking less than 1 hour. However, it is more preferable to add the styrene monomer slowly than to add it all at once. In general the styrene monomer is added as follows; that is, polyethylene resin particles are dispersed in an aqueous medium prepared by adding 0.01 to 5%, preferably 0.2 to 1%, by weight based on the weight of the water of a suspending agent such as water soluble high molecular materials, e.g., polyvinyl alcohol or methyl cellulose and slightly water soluble inorganic materials, e.g., calcium phosphate or magnesium pyrophosphate, and then the styrene monomer is added thereto. Basically any of the conventionally known and commonly used suspending agents for polymerization can be employed. These agents are well-known in the art and can be freely selected by one skilled in the art. Water is used in an amount generally from about 0.7 to 5, preferably 0.8 to 2 times that of the particles employed in the aqueous suspension, on a weight basis.

In the polyethylene resin containing the styrene monomer absorbed therein, the polymerization of the styrene monomer is carried out using catalysts.

In the process of the present invention, catalysts are used for polymerizing the styrene monomer. As such catalysts, those suitable for suspension polymerization are generally used with the catalyst being used in an amount of about 0.05 to 2 percent by weight, preferably 0.1 to 1 percent by weight, based on the weight of the styrene monomer. Examples of suitable catalysts include organic peroxides such as benzoyl peroxide, lauroyl peroxide, t-butyl perbenzoate and t-butyl perpivalate and azo compounds such as azobisisobutylonitrile and azobis-dimethylvaleronitrile. These catalysts can be used alone or as a combination of two or more thereof. These catalysts are used in the embodiments of the process of the present invention by dissolving the catalyst in the styrene monomer to be absorbed in the polyethylene resin particles or by dissolving the catalyst in a solvent which does not have a adverse influence on the polymerization reaction. Such solvents include toluene, benzene and 1,2-dichloropropane, etc.

The polymerization of the styrene monomer absorbed in the polyethylene resin particles proceeds in the interior of the polyethylene resin particles. When the polymerization is completed, the polyethylene resin particles containing the polystyrene resin uniformly dispersed therein are obtained.

The resulting polyethylene resin particles which contain the polystyrene resin uniformly dispersed therein are used as raw for producing foamable polyethylene resin particles and as raw materials for producing foamed polyethylene resin articles such as sheets, rods and pipes using an extruder. In the case of producing articles using an extruder, if conventional polyethylene resins are used, the shape just after molding changes with the lapse of time. For example, if a foamed polyethylene resin sheet having a thickness of about 1 mm is left in a free state just after extrusion, the thickness becomes about 2 mm. This change is not uniform and is generally affected by the temperature at which the extrudate is left, the period of time, and other factors. Consequently, it is difficult to control these changes in shape. Thus, the present method is usually adopted which comprises cross-linking in the extruder to produce cross-linked foamed polyethylene resin articles which do not undergo a change in shape with the lapse of time. On the contrary, when polyethylene resin particles containing the polystyrene resin uniformly dispersed therein produced by the embodiments of the process of the present invention are used for molding, foamed polyethylene resin articles can be produced which do not undergo a change in shape with the lapse of time, the so-called, non-ageing foamed polyethylene resin articles, without carrying out any cross-linking treatment in the extruder.

In the embodiments of the process of the present invention, blowing agents are used if it is desired to produce foamable polyethylene resin particles. The blowing agents used have the property that they do not dissolve or only slightly swell the polyethylene resin and the polystyrene resin formed in the polyethylene resin particles. Further, the blowing agents should have a boiling point lower than the softening point of the polyethylene resin and should be gaseous or liquid at room temperature (about 20°–30°C) and normal pressure (about atmospheric). These blowing agents are well-known in the art and generally have boiling points ranging from −42° to 80°C, more generally −10° to 36°C. Suitable blowing agents include aliphatic hydrocarbons such as n-propane, n-butane, iso-butane, n-pentane, iso-pentane, n-hexane and neopentane, cycloaliphatic hydrocarbons such as cyclobutane and cyclopentane, and halogenated hydrocarbons such as methyl chloride, ethyl chloride, methylene chloride, trichlorofluoromethane, dichlorofluoromethane, dichlorodifluormethane, chlorodifluoromethane and dichlorotetrafluoroethane, etc. These blowing agents can be used alone or as mixtures of two or more thereof. If n-butane, ethyl chloride and dichlorotetrafluoroethane which are gaseous at room temperature and normal pressure are used as a mixture, it is possible to achieve foaming to a low bulk density. The preferable amount of the blowing agent is in a range of about 5 to 20% by weight based on the weight of the formed polyethylene resin particles.

Impregnation of the blowing agent in the polyethylene resin particles is carried out by the method which comprises suspending the polyethylene resin particles produced by the embodiments of the process of the present invention in an aqueous medium in which the same suspending agent as that used in the polymerization is dispersed, adding the blowing agent to the resulting suspension, and stirring at a temperature of, preferably, about 40° to 80°C. A high temperature is not preferred because the particles produced become flat.

The foamable polyethylene resin particles of the present invention can be produced using the above-described method. The resulting foamable polyethylene resin particles easily foam at a temperature of above the softening point of the particles using a heating medium such as steam or hot air to produce foamed particles. These foamed particles are charged in a mold cavity which permits the escape of gases but retains the foamable polyethylene resin articles. The particles are then heated again using the above-described heating medium to cause further foaming of the particles, by which the particles fuse together in a body to form a foamed polyethylene resin article having a shape corresponding to the mold.

In order to broaden the molding conditions used at molding it is preferred to carry out the cross-linking of the polyethylene resin simultaneously with the polymerization of the sytrene monomer in the polyethylene resin particles. Namely, when the foamed particles have a high bulk density, they are not affected as greatly by the heating temperature and the heating time even if the temperature is somewhat high and the time is somewhat long. However, when the bulk density becomes low, they are easily affected by the temperature and the time. For this reason, it is preferred to carry out the cross-linking of the polyethylene resin simultaneously with the polymerization of the sytrene monomer in the polyethylene resin particles and before impregnation of the blowing agent in order to produce foamed articles of low bulk density. For this purpose, cross-linking agents are used. Such cross-linking agents include di-t-butyl-peroxide, t-butyl-cumylperoxide, dicumyl-peroxide, α,α-bis-(t-butylperoxy)-p-diisopropylbenzene, 2,5-dimethyl-2,5-di-(t-butylperoxy)-hexyne-3,2,5-dimethyl-2,5-di-(benzoylperoxy)-hexane and t-butyl-peroxyisopropyl-carbonate. These cross-linking agents are absorbed in the polyethylene resin particles together with the styrene monomer by dissolving the cross-linking agent in an amount of about 0.1 to 2 weight %, preferably 0.5 to 1 weight percent, based on the weight of the polyethylene in the styrene monomer added to the polyethylene resin particles suspended in water, or the cross-linking agent are absorbed in the polyethylene resin particles by dissolving the cross-linking agent in a small amount of a solvent which dissolves the polyethylene resin and does not have any influence upon the polymerization reaction of the sytrene monomer and adding the resulting solution separately from the styrene monomer. The cross-linking agent absorbed in the polyethylene resin particles causes cross-linking of the polyethylene resin. The styrene monomer is polymerized catalytically while the resin particles are cross-linked by the cross-linking agent to produce polyethylene resin particles containing the formed polystyrene resin uniformly dispersed therein. The above-described cross-linking agent is added to these resulting polyethylene resin particles to produce the foamable polyethylene resin particles.

The resulting foamable polyethylene resin particles can endure higher temperatures and excessive heating times. Namely, when foamed particles having a bulk density of about 0.025 g/cm³ are heated at 110°C in a mold cavity which permits the escape of gases but retains the foamable polyethylene resin articles using steam, the molding is carried out for 20 seconds to 1 minute in the case of using non-crosslinked polyethylene resin particles. However, in the case of using the cross-linked polyethylene resin particles, it is possible to carry out the molding for 30 seconds to 2 minutes. When heated at 110°C for 1 minute, articles produced from the non-crosslinked particles contract 2% (by volume) after molding, while articles produced from the cross-linked particles do not shrink at all. Therefore, it is preferred to use the cross-linked particles in order to produce foamed articles.

In addition, in the embodiments of the process of the present invention, flame retardants, coloring agents and antistatic agents can be added if desired.

The embodiments of the process of the present invention have the characteristic that the blowing agent is added after the polymerization of the styrene monomer or after the polymerization of the styrene monomer and the cross-linking of the polyethylene resin. Namely, if the blowing ahent is added during polymerization or the polymerization and the cross-linking, the pressure due to the blowing agent becomes high because the polymerization is carried out at above 80°C, e.g., about 80° to 120°c, and cross-linking is carried out at above 100°C, e.g., about 120° to 160°C. Accordingly, this approach is not economical because it is necessary to use a high pressure autoclave. Furthermore, preferred foamable polyethylene resin particles cannot be obtained because the polyethylene resin particles are flattened under such conditions. However, according to the embodiments of the process of the present invention, since the blowing agent is added after polymerization or polymerization and cross-linking, the blowing agent can impregnate sufficiently at a temperature below the softening point of the polyethylene resin, e.g., at about 40° to 50°C. Furthermore, since the addition of the blowing agent and the polymerization or the polymerization and cross-linking are carried out separately, a decrease in the viscosity caused by the blowing agent does not occur during polymerization, and consequently, the polymerization does not require a long period of time. Further, powdery polymers are not produced. Thus, it becomes possible to use more than 30% by weight of the styrene monomer.

Foamed polyethylene resin articles produced from only a polyethylene resin or from polyethylene resins which contain a polystyrene resin formed by using below 20% by weight and particularly below 9% by weight of styrene monomer cannot be used for packaging heavy articles or as building materials because they have low rigidity and are very elastic. On the contrary, articles produced by the embodiments of the process of the present invention can be used for packaging heavy articles or as building materials, because these moldings have high rigidity.

Moreover, a high temperature or a long period of time is necessary in order to impregnate the blowing agent in cross-linked polyethylene resins which do not contain the polystyrene resin. However, according to the embodiments of the process of the present invention, since the previously cross-linked polyethylene resin particles have a high polystyrene resin content, impregnation of the blowing agent can be carried out at a low temperature and for a short period of time. Thus, it is not necessary to use a pressure resistant reactor, and the particles do not have a flat shape.

In the foamable polyethylene resin particles produced by the embodiments of the process of the present invention, disappearance of the blowing agent can be minimized because the foaming polyethylene resin particles of this invention contain a large amount of the polystyrene resin and possess a good storage stability for the blowing agent and a good molding property. Further, inexpensive foamed articles can be produced since they can foam to a low density even after they are stored for a period of time.

Furthermore, foamed polyethylene resin articles prepared by mixing non-cross-linked polyethylene resin particles containing the polystyrene resin uniformly dispersed therein with a blowing agent in an extruder by heating, and extruding the mixture to make sheets, rods or pipes do not undergo a change in size with the lapse of time.

The polyethylene resin particles produced by the embodiments of the process of the present invention have the above-described many advantages.

The present invention will be illustrated in greater detail by reference to the following examples. Unless otherwise indicated, all parts, percents, ratios and the like are by weight.

EXAMPLE 1

2,000 g of pure water, 9 g of magnesium pyrophosphate and 0.4 g of sodium dodecylbenzene sulfonate as suspending agents were charged in a 5.6 liter polymerization reactor to prepare an aqueous medium. Then 1,000 g of polyethylene resin particles having an MI value of 0.5, a density of 0.926 g/cm$^3$ and a softening point of 83°C (commercial name: Mirason ACE-30N, produced by Mitsui Polychemical Co.) were suspended in the aqueous medium. The suspension was stirred at 320 r.p.m. On the other hand, 10 g of benzoyl peroxide and 1 g of tert-butyl perbenzoate were dissolved in 1,000 g of styrene monomer (100% by weight based on the particles) to prepare a monomer solution. This solution was added dropwise to the above dispersion while keeping the temperature at 85°C. Polymerization was carried out for 7 hours. After cooling, the reaction mixture was removed, and an acid was added to decompose the suspending agents. Thus, polyethylene resin particles containing a polystyrene resin were obtained. The powdery polymer formed was 0.9% by weight.

EXAMPLE 2

Polyethylene resin particles containing a polystyrene resin uniformly dispersed therein were produced by polymerizing for 6 hours using the same procedure as described in Example 1 except for using 1,400 g of polyethylene resin particles, commercial name: Yukaron HE-60 produced by Mitsubishi Petro-chemical Co., 6 g of benzoyl peroxide, 0.6 g of tert-butyl perbenzoate and 600 g of styrene.

EXAMPLE 3

2,000 g of polyethylene resin particles produced in Example 1 was suspended in an aqueous medium prepared by adding 9 g of magnesium pyrophosphate and 0.4 g of sodium dodecylbenzene sulfonate in 2,000 g of water with stirring at 320 r.p.m. 300 g of n-butane was then introduced at 50°C under a pressure of 7 kg/cm$^2$. The mixture was warmed to 60°C. After stirring was continued for about 6 hours at this temperature, the product was removed and an acid was added to decompose the suspending agents.

After allowing the resulting particles to stand for 24 hours, they were dipped in boiling water for 2 minutes, by which prefoamed particles having a bulk density of 0.02 g/cm$^3$ were obtained. As the result of examination on the condition of the cells in the interior of the prefoamed particles by cutting the center part thereof, it was found that the foamed particles contained 80–150 cells per 1 mm$^2$.

These pre-foamed particles were charged in a mold cavity having a size of 400 × 400 × 50 mm which permits the escape of gases but retains the particles. Steam at a pressure of 0.8 kg/cm$^3$ was introduced into the mold cavity. After heating for 50 seconds, the mold was cooled for 2 minutes and the molding removed. The resulting articles had a bulk density of 0.020 g/cm$^3$ and a good appearance. When these articles were subjected to stressing for breaking, each particle was completely coalesced to each other by fusing.

EXAMPLE 4

2,000 g of pure water, 9 g of magnesium pyrophosphate and 0.4 g of sodium dodecylbenzene sulfonate as suspending agents were charged in a 5.6 liter autoclave to prepare an aqueous medium. Then, 1,000 g of polyethylene resin particles having an MI value of 0.5, a density of 0.926 g/cm$^3$ and a softening point of 83°C (commercial name: Mirason ACE-30N produced by Mitsui Polychemical Co.) was suspended in the above aqueous medium. The suspension was stirred at 320 r.p.m. On the other hand, 20 g of dicumyl peroxide as a cross-linking agent and 10 g of benzoyl peroxide as a polymerization catalyst were dissolved in 1,000 g of styrene (100% by weight based on the particles) to prepare a monomer solution. This solution was added dropwise to the aqueous medium to cause absorption by the polyethylene resin particles, while polymerization was carried out by keeping the temperature at 85°C for 4 hours. Subsequently the temperature was elevated to 140°C. After stirring for 3 hours at this temperature, the mixture was cooled and removed. An acid was added thereto to decompose the suspending agents. Thus, cross-linked polyethylene resin particles containing a polystyrene resin were obtained.

EXAMPLE 5

Cross-linked polyethylene resin particles containing a polystyrene resin therein were produced by polymerizing for 3 hours using the same procedure as described in Example 4 except for using 1,500 g of polyethylene resin particles, 30 g of dicumyl peroxide, 5 g of benzoyl peroxide, 0.5 g of t-butyl perbenzoate and 500 g of styrene (about 33% by weight based on the polyethylene resin particles).

EXAMPLE 6

Cross-linked polyethylene resin particles containing a polystyrene resin therein were produced in the same manner as in Example 4 except for using polyethylene resin particles having an MI value of 8, a density of 0.919 g/cm$^3$ a softening point of 83°C (commercial name: Novatek LM-400 produced by Mitsubishi Chemical Industries, Ltd.).

EXAMPLE 7

Cross-linked polyethylene resin particles containing a polystyrene resin uniformly dispersed therein were produced by carrying out polymerization and cross-linking under the same conditions as described in Example 4 except for using 1,200 g of the polyethylene resin particles as described in Example 6, 24 g of dicumyl peroxide, 8 g of benzoyl peroxide, 0.8 g of tert-butyl-perbenzoate and 800 g of styrene (67% by weight based on the polyethylene resin particles).

2,000 g of the resulting particles was suspended in an aqueous medium prepared by adding 9 g of magnesium pyrophosphate and 0.4 g of sodium dodecyl benzenesulfonate in 2,000 g of water with stirring at 320 r.p.m. Then 300 g of n-butane was introduced at 50°C under a pressure of 7 kg/cm$^2$. The mixture was warmed to 60°C. After stirring was continued for 4 hours at this temperature, the product was cooled and removed. An acid was added to decompose suspending agents.

The resulting foaming polyethylene resin particles which were not flat contained 9.02% by weight of n-butane and could be foamed to a bulk density of 0.020 g/cm$^3$. The pre-foamed particles had 60–80 cells per 1 mm$^2$. After leaving the pre-foamed particles for 6 hours, they were charged in a mold cavity having a size 30 × 30 × 7.7 cm. After heated for one minute and 20 seconds with steam under a pressure of 0.8 kg/cm$^2$, the mold was cooled for 2 minutes. Then a plate article was removed from the mold cavity. The resulting foamed polyethylene articles had a good appearance, did not shrink, and had a density of 0.02 g/cm$^3$. The bulk densities of the resulting foamable polyethylene resin particles after allowing them to stand for 7 days, 15 days and 30 days were 0.024 g/cm$^3$, 0.029 g/cm$^3$ and 0.032 g/cm$^3$, respectively. Retention of the blowing agent and the molding properties of the foaming polyethylene resin were quite excellent.

COMPARISON EXAMPLE 1

Polymerization was carried out using the same procedure as described in Example 1 except polyethylene resin particles having an MI value of 22 and a density of 0.919 g/cm$^3$ (commercial name: Novatek LM-420, produced by Mitsubishi Chemical Industries, Ltd.) was used. Then permeation of the blowing agent was carried out in the same manner as described in Example 3.

The resulting particles contained 9% by weight of n-butane and the bulk density thereof after ageing for 24 hours was only 0.04 g/cm$^3$ notwithstanding the shape thereof was maintained. The bulk density after 10 days was 0.1 g/cm$^3$. This means that if polyethylene resins having an MI value which is too high are used, foaming polyethylene resin particles having a high foaming enlargement cannot be obtained and retention of the blowing agent is low.

From this fact, it can be seen that polyethylene resins having a high MI value are not suitable for producing foamable polyethylene resin particles.

COMPARISON EXAMPLE 2

Polymerization was carried out using the same procedure as described in Example 1 except polyethylene resin particles having an MI value of 0.3 and a density of 0.935 g/cm$^3$ (commercial name: Yukaron EC-60A, produced by Mitsubishi Petro-chemical Co.) was used. Then impregnation of the blowing agent was carried out in the same manner as described in Example 3.

The resulting particles contained 8.5% by weight of n-butane and they did not foam at all upon heating using steam, their initial shape was maintained.

It can be seen that polyethylene resins having a high density are not suitable for producing foamable polyethylene resin particles.

COMPARISON EXAMPLE 3

Polymerization was carried out using the same procedure as described in Example 1 except polyethylene resin particles having an MI value of 0.5, a density of 0.920 g/cm$^3$ and a softening point of 90°C (commercial name: Yukaron HE-30, produced by Mitsubishi Petro-chemical Co.) was used instead of the polyethylene resin particles used in Example 1. Then permeation of the blowing agent was carried out in the same manner as described in Example 3.

The resulting pre-foamed particles contained 8% by weight of n-butane and the bulk-density after ageing for 24 hours was only 0.067 g/cm$^3$.

It is clear from the above-described results that polyethylene resins having a high softening point as well as polyethylene resins having an MI value of above 10 and a density of above 0.93 g/cm$^3$ are not suitable for use as raw materials for producing foamable polyethylene resin particles.

EXAMPLE 8

To a base resin of 50 parts of polyethylene resin particles produced by Example 1 and 50 parts of polyethylene resin particles (commercial name: Mirason ACE-30N, produced by Mitsui Poly-chemical Co.), 0.1 part of polybutene and 0.1 parts of citric acid were added. The mixture was blended using a tumbler, 0.2 parts of sodium bicarbonate and 0.5 parts of talc were added to this mixture and sufficiently mixed. The mixture was supplied to an extruding apparatus. This extruding apparatus comprised two extruders having an inside diameter of 40 mm connected in series. Butane as the blowing agent was introduced from one end part of the first extruder (raw material feeding side) in an amount of 9.6 parts based on 100 parts of the base resin by applying pressure. The extrusion temperature was 110°–220°C. The resin was extruded at a speed of 6.2 kg/hour from an annular slit having a diameter of 54 mm and a width of 0.35 mm provided on a cap at the end part of the second extruder into the atmosphere to cause foaming. The extrudate was then cooled while stretching by sliding on a plug surface of a cylinder having a circumference of 480 mm (diameter: 153 mm) to produce a tubular foamed sheet. This tubular foamed sheet was slit to produce a foamed sheet which had a thickness of 1.41 mm and a width of 447 mm just after extrusion and a thickness of 1.45 mm and a width of 450 mm after ageing. The density of the foamed sheet was 0.048 g/cm$^3$, and the appearance was excellent.

COMPARISON EXAMPLE 4

A foamed sheet was produced using the same procedure as described in Example 8 except only 100 parts of polyethylene resin particles (commercial name: Mirason ACE-30N, produced by Mitsui Polychemical Co.) were used without using the polyethylene resin particles produced by Example 1. This sheet had a thickness of 0.32 mm and a width of 405 mm just after extrusion and a thickness of 1.05 mm and a width of 426 mm after ageing. The density of this sheet was 0.65 g/cm$^3$. The sheet had many stripe-like patterns in the extruding direction.

While the invention has been described in detail and with reference to specific embodiments thereof, it will be apparent to one skilled in the art that various changes and modifications can be made therein without departing from the spirit and scope thereof.

What is claimed is:

1. A process for producing foamable polyethylene resin particles which comprises the steps of:
    a. suspending in an aqueous medium polyethylene resin particles having an MI value of 0.3 to 10, a density of less than 0.93 g/cm$^3$ and a softening point below 85°C;
    b. adding to said aqueous suspension of (a) a cross-linking agent for cross-linking said polyethylene resin particles;

c. adding to said aqueous suspension of (b) 30 to 100% by weight based on the weight of said particles of a styrene monomer and a catalyst for polymerizing said monomer;

d. cross-linking said polyethylene resin particles and polymerizing said monomer in the interior of said polyethylene resin particles; and incorporating, after the polymerization, a blowing agent into the resulting cross-linked polyethylene resin particles which contain a polystyrene resin formed by the polymerization of said styrene monomer at a temperature below the softening point of said polyethylene resin particles, wherein said blowing agent does not substantially reduce the viscosity of the polymerization system, does not dissolve said resin particles or only slightly swells the polyethylene resin particles, said polyethylene resin particles exhibiting excellent foaming ability and blowing agent retention.

2. The process for producing foamable polyethylene resin particles of claim 1, wherein said polyethylene resin is an ethylene homopolymer or a copolymer containing ethylene as a major component with a monomer selected from the group consisting of vinyl chloride, vinyl acetate and methyl methacrylate.

3. The process for producing foamable polyethylene resin particles of claim 1, wherein said styrene monomer is styrene or a mixture of a major amount of styrene and a copolymerizable monomer selected from the group consisting of $\alpha$-methyl styrene, acrylonitrile, methyl methacrylate, dimethyl maleate and divinyl benzene.

4. The process for producing foamable polyethylene resin particles of claim 1, wherein said aqueous medium contains a suspending agent.

5. The process for producing foamable polyethylene resin particles of claim 1, wherein said catalyst is an organic peroxide or an azo compound.

6. The process for producing foamable polyethylene resin particles of claim 1, wherein said blowing agent is an aliphatic hydrocarbon, a cycloaliphatic hydrocarbon, or a halogenated hydrocarbon.

7. The process for producing foamable polyethylene resin particles of claim 1, wherein said blowing agent is present in an amount of about 5 to 20% by weight based on the weight of the foamable polyethylene resin particles.

8. The process for producing foamable polyethylene resin particles of claim 1, wherein said polymerizing is at a temperature of from about 80° to 120°C.

9. The process for producing foamable polyethylene resin particles of claim 1, wherein said cross-linking agent is di-t-butyl-peroxide, t-butyl-cumylperoxide, dicumyl-peroxide, $\alpha,\alpha$-bis-(t-butylperoxy)-p-diisopropylbenzene, 2,5-dimethyl-2,5-di-(t-butylperoxy)-hexyne-3, 2,5-dimethyl-2,5-di-(benzoylperoxy)-hexane or t-butyl-peroxy-isopropyl-carbonate.

10. The process for producing foamable polyethylene resin particles of claim 1, wherein said polymerizing is at a temperature of from about 80° to 120°C and said cross-linking is at a temperature of from about 120° to about 160°C.

11. The process of claim 1, wherein about 60 to 100% by weight of said styrene monomer is added.

12. The process of claim 1, wherein about 30 to 60% by weight of said styrene monomer is added.

13. The process of claim 1, wherein said blowing agent has a boiling point lower than the softening point of said polyethylene resin particles.

14. The process of claim 13, wherein said blowing agent has a boiling point ranging from −42° to 80°C.

15. The process of claim 1, wherein said blowing agent is added to said suspension at a temperature of about 40° to 80°C, whereby flattening of said polyethylene resin particles is avoided.

* * * * *